United States Patent
Binkert (10) Patent No.: US 12,301,064 B2
(45) Date of Patent: May 13, 2025

(54) METHOD FOR DETERMINING AN AIR GAP BETWEEN A TRANSPORT ROTOR AND A STATOR SEGMENT AIDED BY AN AUTOMATION DEVICE

(71) Applicant: Siemens Aktiengesellschaft, Munich (DE)

(72) Inventor: Tobias Binkert, Heroldsbach (DE)

(73) Assignee: Siemens Aktiengesellschaft, Munich (DE)

( * ) Notice: Subject to any disclaimer, the term of this patent is extended or adjusted under 35 U.S.C. 154(b) by 142 days.

(21) Appl. No.: 18/110,985

(22) Filed: Feb. 17, 2023

(65) Prior Publication Data
US 2023/0268805 A1    Aug. 24, 2023

(30) Foreign Application Priority Data

Feb. 22, 2022    (EP) .................................... 22157866

(51) Int. Cl.
*H02K 11/20*    (2016.01)
*H02K 41/02*    (2006.01)

(52) U.S. Cl.
CPC ............. *H02K 11/20* (2016.01); *H02K 41/02* (2013.01); *H02K 2201/03* (2013.01); *H02K 2213/03* (2013.01)

(58) Field of Classification Search
CPC .... H02K 11/20; H02K 41/02; H02K 2201/03; H02K 2213/03
USPC ...................................................... 318/687
See application file for complete search history.

(56) References Cited

U.S. PATENT DOCUMENTS

| 6,208,497 | B1 | 3/2001 | Seale et al. |
| 6,763,285 | B2* | 7/2004 | Setiawan ............ F16C 32/0446 |
| | | | 73/66 |
| 2017/0346380 | A1 | 11/2017 | Weber et al. |

FOREIGN PATENT DOCUMENTS

| AT | 321418 B | 3/1975 |
| EP | 3251985 | 12/2017 |
| EP | 3367558 | 8/2018 |
| JP | H048807 | 1/1992 |

(Continued)

OTHER PUBLICATIONS

JP H0488806 A (Translation) Air-Gap Controller for Linear Motor No Drawings (Year: 1992).*

(Continued)

*Primary Examiner* — Jorge L Carrasquillo
(74) *Attorney, Agent, or Firm* — Cozen O'Connor (57) ABSTRACT

A method for determining an air gap between a transport rotor and a stator segment, wherein an acceleration run of the transport rotor is performed and, here, the present stator current is measured and actual speed values are determined, from which a change in speed per time unit is determined, and from which an acceleration is determined, where the present propulsion force is determined from the product of the force constant and the present stator current, where the present propulsion force and the acceleration are used to determine a virtual mass of the transport rotor, and where for a statement about the currently prevailing air gap a relationship between an increase in the virtual mass and an enlargement of the air gap is used and a size value for the air gap is calculated therefrom.

17 Claims, 7 Drawing Sheets

(56) References Cited

FOREIGN PATENT DOCUMENTS

JP    10488806    3/1992
JP    H0488806 A  *  3/1992   .......... B60L 2200/26

OTHER PUBLICATIONS

Andreas et al. (EP3251985A1)Method for Operating a Long Stator Linear Motor Date Published Dec. 6, 2017 (Year: 2017).*
EP Search Report dated Aug. 29, 2022 based on EP22157866 filed Feb. 22, 2022.

* cited by examiner

METHOD FOR DETERMINING AN AIR GAP BETWEEN A TRANSPORT ROTOR AND A STATOR SEGMENT AIDED BY AN AUTOMATION DEVICE

BACKGROUND OF THE INVENTION

1. Field of the Invention

The invention relates to an automation device and method for determining an air gap between a transport rotor and a stator segment, where the transport rotor and the stator segment are operated as a linear motor unit of a linear-motor-based transport system, and the linear motor unit is assigned a force constant, and where the stator segment is supplied with a stator current, such that a magnetic field is formed and a propulsion force for propelling the transport rotor is thereby produced.

Within the meaning of the invention, a stator segment is understood to be a primary part of a linear motor; in this context, a transport rotor has a secondary part of the linear motor.

2. Description of the Related Art

When, for example, coils for generating a gliding magnetic field are energized individually, a magnetic field is generated and the transport rotor or its secondary part can move across the stator segment or its primary part. The gliding magnetic field accordingly also carries along permanent magnets of the transport rotor. It is possible to adjust a force requirement and speed by controlling the current strength of the current through the coils.

EP 3 367 558 A1 discloses a method for operating a linear-motor-based transport system and a control unit. In the known method or automation device, it is disadvantageous that an air gap between the transport rotor and a stator segment can be determined only manually or with the aid of additionally attached sensors.

So that linear-motor-based transport systems of this kind can be moved without disturbance, in particular without vibrations, the linear motors used must be commissioned with correct control parameters. The control parameters of the linear motor are in turn coordinated with an air gap size according to the data sheet of the motor. With linear motors, adherence to the air gap size is therefore obligatory in order to be able to operate the motor with the electrical ratings of the motor in a problem-free manner. A decisive factor for the smooth operation of the linear motor unit is thus observance of the correct installation dimension of the linear motors so that the size of the air gap according to the data sheet of the manufacturer is adhered to.

Insufficient sizes of the air gap cause fluctuations in the speed value of the transport rotor, where an aim is to avoid these fluctuations. Measuring devices that can be used to measure the air gap size between the transport rotor and the stator segment tend to be rarely available in practice.

SUMMARY OF THE INVENTION

In view of the foregoing, it is therefore an object of the invention is to provide an automation device and method for identifying possible air gap deviations without an external measuring device.

This and other objects and advantages are achieved in accordance with the invention by a method via which an acceleration run of a transport rotor is implemented. Here, the present stator current is measured and actual speed values are determined, from which in turn a change in speed per time unit is determined, from which in turn an acceleration is determined, where the present propulsion force is determined from the product of the force constant and the present stator current, where the present propulsion force and the acceleration are used to determine a virtual mass of the transport rotor with Newton's equation of motion, and where, for a statement about the currently prevailing air gap, a relationship between an increase in the virtual mass and an enlargement of the air gap is used and a size value for the air gap is calculated therefrom.

It is advantageous that the identification of the size of the air gap can now be realized with the available means of a control system without additional measurement devices. The force constant is to be understood to mean the force in Newtons generated by the motor with an effective value of the sine wave of current of 1 A. The larger the air gap, the greater the current strength required to move the transport rotor or a load with the same dynamic response. This physical relationship is used to determine the air gap size indirectly. A function module, which could also be referred to as the moment of inertia estimator, is used for the determination. This function module determines a present load of the linear motor, taking into account the current strength and the force constant. A virtual mass can then be calculated from the determined load or the present propulsion force. With the aid of the virtual mass and the real mass of the transport rotor, the air gap size can be determined.

It is also advantageous if a compensation for a friction force occurring between the transport rotor and guide rails is provided. The friction between the transport rotor and the stator segment should be known before the present propulsion force is determined, because without compensating for the friction this would be interpreted as an additional load or additional force. The friction force must be subtracted from the determined propulsion force. It is customary to create a friction characteristic that is distributed evenly over an entire speed range; this is then taken into account for the calculation of the air gap.

In order to implement the computational method advantageously, for example, in a function module of a programmable logic controller, a spline function is used as the relationship between the increase in the virtual mass and the enlargement of the air gap, where the spline function is used for interpolation with piecewise polynomials of a low degree, wherein the spline function uses interpolation nodes consisting of an x value and a y value, where the x value is assigned to the determined virtual mass and the y value to the size value for the air gap. Here, the polynomials of the spline function each describe an interval, and the boundary values of the intervals are assigned to values of the virtual mass, where the determined virtual mass is used to search for the associated interval and the polynomial to be evaluated is thereby ascertained.

Interpolation node is a term from numerical mathematics. This term is used to describe the arguments of functions that are used for subsequent computation. The term is used, for example, in interpolation or also numerical integration. The associated function value at the interpolation node is sometimes called the interpolation value, where the ordered pair of interpolation values is then called the interpolation point.

It is advantageous if the virtual mass to be determined in a first function module is calculated in an automation device, where the stator current and the actual speed values are determined as input variables via sensors that are operated on the transport system. Further input variables, such as the force constant and a real mass, are queried from a data module. The method is further optimized if the friction force is determined in a second function module with the aid of a friction characteristic, and the determination of the air gap is determined in a third function module.

The inventor has identified that, in order to maintain the accelerating force, the motor current must increase in line with the increasing size of the air gap. The mass to be accelerated is directly proportional to the accelerating force. Consequently, the value of the mass or of the virtual mass likewise increases.

One possibility for providing a function for determining the air gap size is to determine the relative increase in the virtual mass experimentally as a function of the real air gap size so that the air gap can later be calculated based on the measurement results. This investigation can be performed with the aid of a laboratory experiment, for example, by the air gap size between the transport rotor and the stator segment being influenced in a defined manner by stainless-steel plates, starting, for example, with spacer plates of 0.5 mm and then increasing to 2.5 mm in 0.1 mm increments. From all calculations of the virtual masses occurring during this process, a relative increase in the mass is subsequently recorded each time the air gap is enlarged by one tenth of a mm. These values can then be used for the calculation of the air gap size in which, starting from the real weight of the transport rotor, a function is calculated that contains the masses to be expected for the increasing air gap sizes. Based on the results obtained, a linear spline function is preferably used that mathematically maps the dependency between the mass and the air gap size. Starting from the real mass of the transport rotor including its load, the mass to be expected is modeled mathematically as a function of the air gap size. The result of the spline interpolation is a function that maps the mass that increases with the air gap from 0.5 mm to 2.5 mm.

The object and advantages in accordance with the invention are likewise achieved by an automation device, which is configured to determine the air gap between a transport rotor and a stator segment, where the transport rotor and the stator segment are configured as a linear motor unit of a linear-motor-based transport system, and the linear motor unit is assigned a force constant, and where the stator segment is supplied with a stator current, such that a magnetic field is formed and a propulsion force for propelling the transport rotor is thereby produced. For determining the air gap, means are present here that are configured to implement an acceleration run of the transport rotor; means are furthermore present which are embodied to measure the present stator current; and means are furthermore present that are configured to determine actual speed values of the transport rotor and in turn to determine a change in speed per time unit therefrom, and in turn to determine an acceleration therefrom, where means are furthermore present that determine the present propulsion force from the product of the force constant and the present stator current, where means are furthermore present that are configured to use the present propulsion force and the acceleration to determine a virtual mass of the transport rotor with Newton's equation of motion, and where for a statement about the currently prevailing air gap a test device is present that is configured to detect an increase in the virtual mass and to calculate a size value for the air gap using a relationship that describes the increase in the virtual mass and an enlargement of the air gap.

The determination of the air gap is furthermore improved if the automation device has a means that is configured to compensate for a friction force occurring between the transport rotor and guide rail.

It is particularly convenient for a user of the automation device if the test device in the automation device is furthermore configured to provide the relationship between the increase in the virtual mass and the enlargement of the air gap as a spline function, which interpolates with piecewise polynomials of a low degree, where the spline function has interpolation nodes consisting of an x value and a y value, where the x value is assigned to the determined virtual shaft mass and the y value is assigned to the size value for the air gap. Here, the polynomials of the spline function each describe an interval and the boundary values of the intervals are to be assigned to values of the virtual mass, where the determined virtual mass is used to search for the associated interval and the polynomial with which the air gap is determined is thereby ascertained.

With the determined mass, a search is accordingly performed until the determined value of the mass lies within an interval. The polynomial used to calculate the air gap size is then the polynomial that was defined for the interval found. The air gap size can then be calculated using the function provided. For this purpose, the determined mass, minus the starting coordinates of the interval found, is used as the x value in the function defined for the interval found.

It is furthermore advantageous if the automation device has a first function module with which the virtual mass is calculated, where inputs for sensors are present, which supply the stator current and the actual speed values as input variables. A data module is furthermore present, which stores the force constant and a real mass.

For a further calculation, it is advantageous if the automation device has a second function module, which determines the friction with the aid of a friction characteristic, and furthermore has a third function module, which is configured to perform the determination of the air gap.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawings shows an exemplary embodiment of the invention, in which.

DETAILED DESCRIPTION OF THE EXEMPLARY EMBODIMENTS

Figure 1:
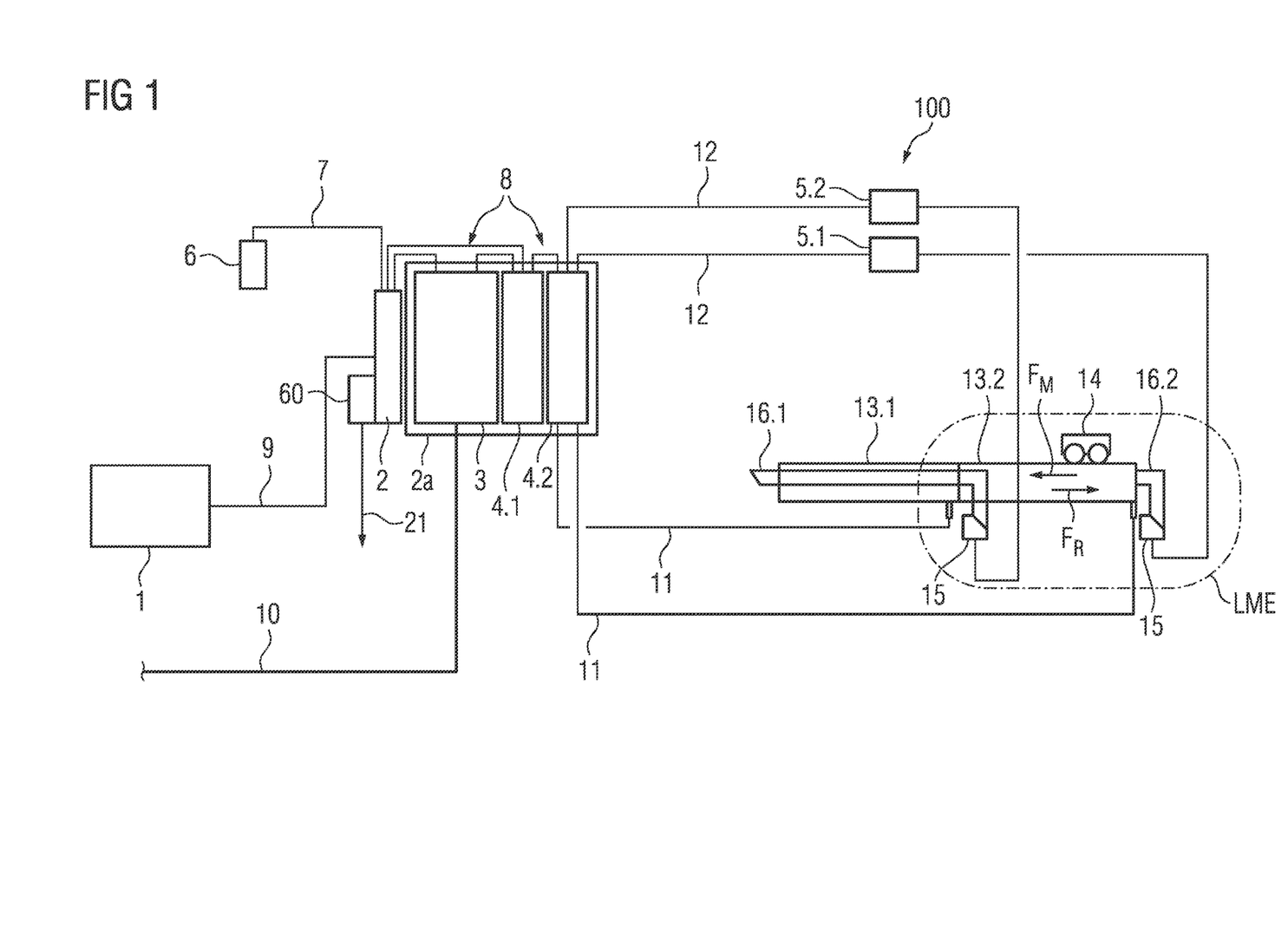
FIG. 1 shows a linear-motor-based transport system in accordance with the invention.

FIG. 1 shows an overview of a linear-motor-based transport system 100. A transport rotor 14 runs over a first stator segment 13.1 and a second stator segment 13.2. A first distance measuring system 16.1 and a second distance measuring system 16.2 are arranged on the stator segments 13.1, 13.2, respectively. The distance measuring systems 16.1, 16.2 are connected to an encoder cable 12. The DRIVE-CLiQ encoder cable 12 is connected to a field bus 8 for servo drives. The field bus 8 is in turn connected to a control unit 2, a rectifier 3 and a first inverter 4.1 and a second inverter 4.2. The inverters 4.1, 4.2 supply the stator segments 13.1, 13.2 via motor feeder cables 11.

The control unit 2 can be programmed accordingly or receive a firmware update via a programming device 1 and an ETHERNET connection 9. The control unit 2 receives its 24 V supply voltage from a power supply 6 by way of a feeder cable 7.

The control unit 2 for controlling the drive module 2a for the linear-motor-based transport system 100 has a test device 60, where the test device 60 is configured to determine the currently prevailing air gap δ. To this end, the test device 60 is configured to detect an increase Δm in the virtual mass $m_v$ and to use a relationship describing the increase Δm in the virtual mass $m_v$ and an enlargement of the air gap to calculate a size value for the air gap δ. It has a means that is configured to compensate for a friction force $F_R$ occurring between the transport rotor 14 and guide rails.

The test device 60 is furthermore configured to provide the relationship between the increase Δm in the virtual mass $m_v$ and the enlargement of the air gap as a spline function f, which interpolates with piecewise polynomials $P_i$ of a low degree, where the spline function f has interpolation nodes x, y consisting of an x value x and a y value y, and where the x value x is assigned to the determined virtual mass $m_v$ and the y value is assigned to the size value for the air gap δ. Here, the polynomials Pi of the spline function f each describe an interval and the boundary values of the intervals are assigned to values of the virtual mass $m_v$, where the determined virtual mass $m_v$ is used to search for the associated interval and the polynomial Pi with which the air gap δ is determined is thereby ascertained.

The test device 60 preventively identifies an air gap change in a production system which works with the linear-motor-based transport system. When an air gap change is identified, a maintenance signal 21 is generated.

Figure 2:
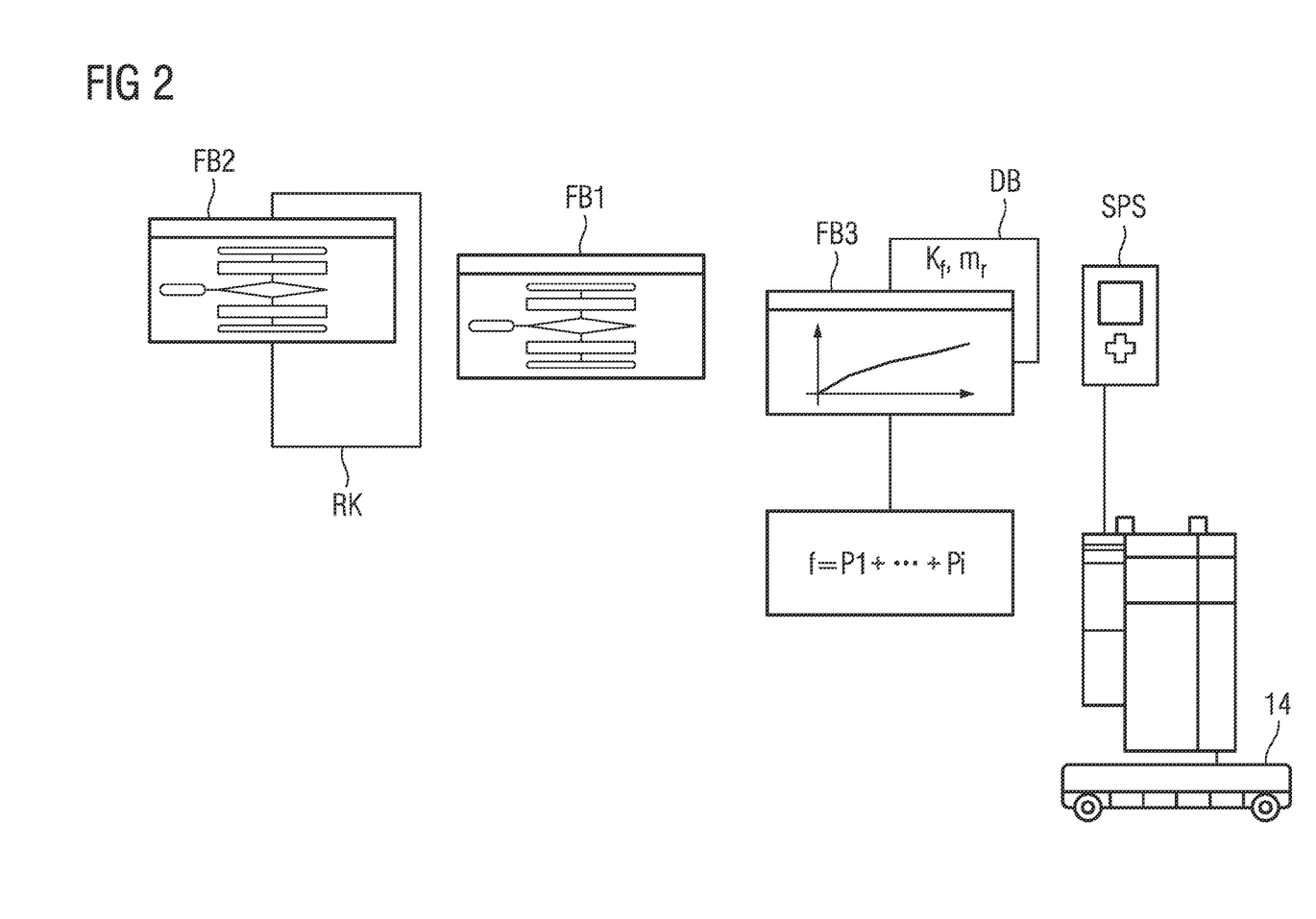
FIG. 2 shows an overview of the method for determining the air gap in accordance with the invention.

FIG. 2 shows the principle of the method for determining the air gap S. A first function module FB1 is used to calculate a virtual mass $m_v$, where the first function module FB1 uses the stator current $I_q$ and the actual speed values $V_{act}$ as input variables. A force constant $k_f$ and a real mass $m_r$ are stored in a data module DB.

With a second function module FB2, a friction force between the transport rotor and the stator segment is determined with the aid of a friction characteristic RK.

With a third function module FB3, the present air gap δ is determined with the aid of a spline function f. The third function module FB3 is accordingly configured to make a statement about the currently prevailing air gap δ, where an increase δm in the virtual mass $m_v$ is identified, and to use a relationship describing the increase δm in the virtual mass MV and an enlargement of the air gap to calculate a size value for the air gap δ.

Here, control means are configured to perform an acceleration run of the transport rotor 14. Here, in particular, the first function module FB1 is configured to use the measured stator current $I_q$ and the actual speed values $V_{act}$ to determine a change in speed per time unit. An acceleration a is in turn determined from this change in speed per time unit. The present propulsion force $f_M$ is then determined from the product of the force constant $k_f$ and the present stator current $I_q$. The present propulsion force $f_M$ and the acceleration a can then be used to determine a virtual mass $m_v$ of the transport rotor 14 with Newton's equation of motion.

The virtual mass $m_v$ thus determined is forwarded to the third function module FB3 for calculating the air gap size. In the third function module FB3, a spline function f with polynomials $P_i$ is implemented as the relationship between the increase Sm in the virtual mass $m_v$ and the enlargement of the air gap. The spline function f will interpolate the air gap size with piecewise polynomials $P_i$ of a low degree. The spline function f uses interpolation nodes x, y, consisting of an x value x and a y value y, where the x value is assigned to the determined virtual mass $m_v$ and the y value is assigned to the size value for the air gap δ. The polynomials $P_i$ of the spline function f are each assigned to an interval and the boundary values of the intervals are assigned to values of the virtual mass $m_v$, where the determined virtual mass $m_v$ is used to search for the associated interval and the polynomial $P_i$ to be evaluated is thereby ascertained.

Figure 3:
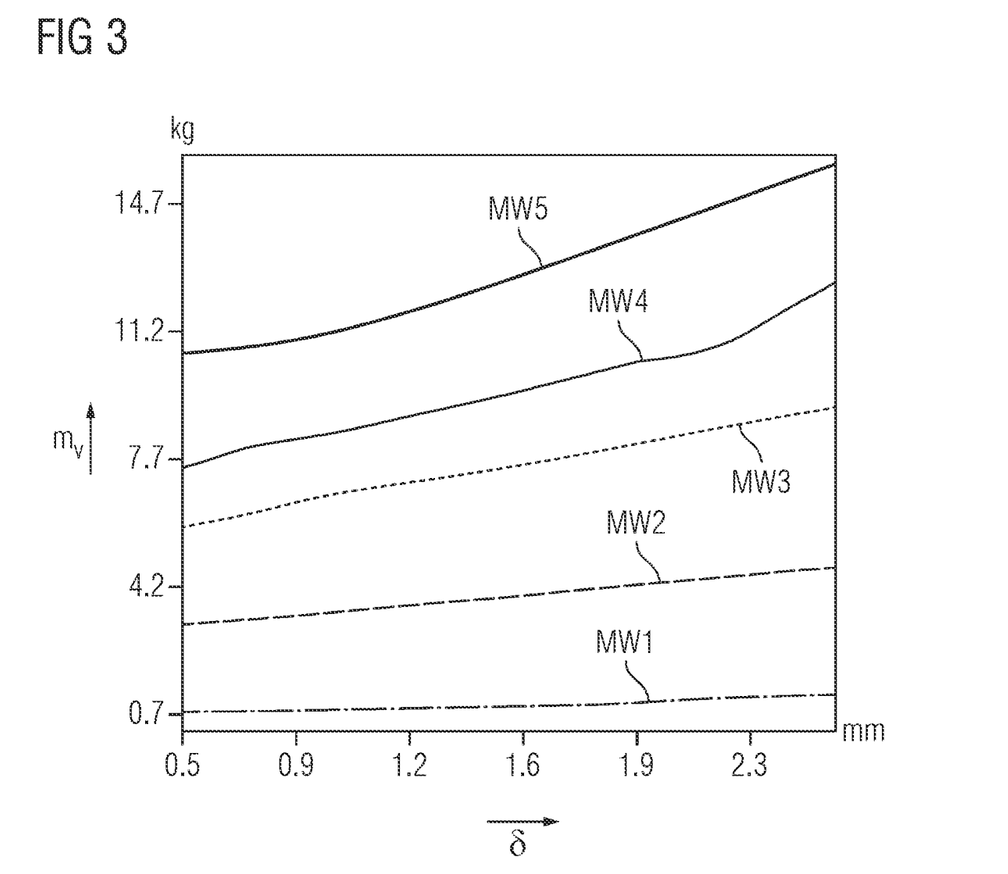
FIG. 3 shows a graphical plot of experimentally determined measured values as a function of the air gap in accordance with the invention.

FIG. 3 demonstrates a possibility for determining a spline function f experimentally. FIG. 3 shows a measured value diagram with a first measured value series MW1, recorded for a mass $m_r$ of 0.77 kg, a second measured value series MW2, recorded for a mass $m_r$ of 3.18 kg, a third measured value series MW3, recorded for a mass $m_v$ of 5.9 kg, a fourth measured value series MW4, recorded for a mass $m_r$ of 7.2 kg, and a fifth measured value series MW5, recorded for a mass $m_r$ of 9.63 kg. A first measurement for the measured value series MW1, . . . , MW5 is performed with an air gap size of 0.5 mm, because this is the value according to the data sheet of the motor used. To this end, the transport rotor 14 is positioned on a segment to be measured and then back to the starting point, which automatically produces an acceleration phase of the transport rotor 14 on the segment. In this way, the first function module FB1 can be used to determine a virtual mass $m_v$.

Stainless-steel strips with a thickness of between 0.1 mm and 0.5 mm can now be inserted experimentally one after the other in increments of one tenth of a millimeter into a guide between the segment and the transport rotor, and the virtual mass $m_v$ resulting therefrom can be calculated in each case.

This determination of measured values is also performed with different additional weights on the transport rotor 14 in order to include in the consideration the relative increase in mass for different weights. The first measured value series MW1 is performed with an unloaded transport rotor 14. In other words, the total mass amounts to 0.76 kg. The measurements are then performed for different air gap sizes in the range from 0.5 mm to 2.5 mm, and the measurement results can be included in the evaluation with the aid of a recording function in the function module. Additional weights in the range from 2.42 kg to 8.87 kg are used for the subsequent measured value series MW1, . . . , MW5 so that the total weight of the transport rotor 14 amounts to between 0.76 kg and 9.63 kg. The weight range has been selected in accordance with a maximum weight, which for a magnetic plate of the transport rotor 14 amounts to approximately 10 kg. The measurement results for the different weights and the air gap size dependencies are shown in FIG. 3.

From all results, the relative increase in the mass m, i.e., the increase Δm each time the air gap is enlarged by one tenth of a mm, is then derived. This derived value of the increase Δm can then be used to calculate the air gap size in the spline function f. Here, starting from the real weight of the transport rotor 14, the spline function f is provided that contains the masses to be expected for the increasing air gap sizes. To this end, the increase Δm is divided into several sections and, for each section, a straight line is calculated that reflects the rate of increase of the mass. The sections then correspond to the polynomials $P_i$ of the spline function f.

Figure 4:
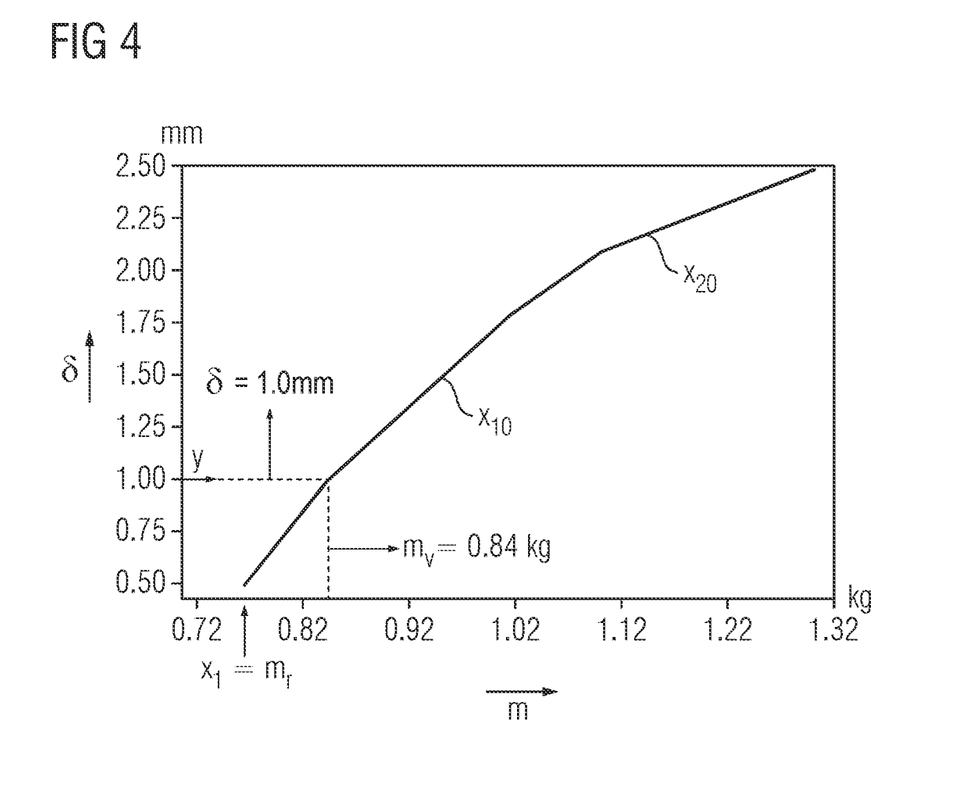
FIG. 4 shows a graphical plot of the evaluation of a spline function in accordance with the invention.

FIG. 4 shows a graphical plot of the evaluation of the spline function f. The spline function f has 21 interpolation nodes, where the first interpolation node $x1=m_r$ is the mass of the transport rotor 14. Accordingly, the x values in the function shown are assigned to the mass $m_r$ and the y values are assigned to the air gap δ. The data sheet of a motor specifies an optimum air gap of 0.5 mm. The further interpolation nodes $x_1$ to $x_{20}$ indicate in each case an increase in the air gap δ by 0.1 mm. Were the first function module FB1 now to determine $m_v$=0.84 kg as a virtual mass, then the associated air gap y=Δ=1.0 mm can be read off or calculated from the spline function f.

Figure 5:
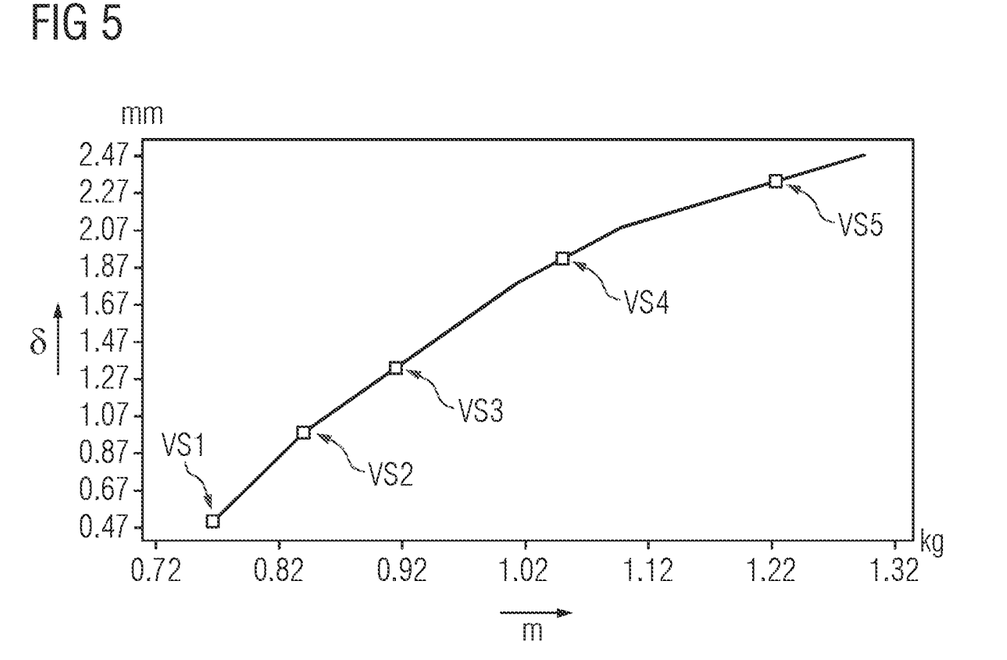
FIG. 5 shows a graphical plot of a comparison between the determined air gap sizes and the real air gap sizes.

FIG. 5 shows a graphical plot of a comparison between determined air gap sizes and real air gap sizes, as a result of which a sufficient accuracy of the spline function f is proven. For a first comparison point VS1, with a real air gap of 0.5 mm, a measured value of 0.76 kg is produced, as a result of which a calculated air gap of 0.5 mm is determined and this corresponds to a deviation of 0.0%. For a second comparison point VS2, with a real air gap of 1.0 mm, a measured value of 0.839 kg is produced, which results in a calculated air gap of 0.988 mm and this corresponds to a deviation of 1.2%. For a third comparison point VS3, with a real air gap of 1.5 mm, a measured value of 0.915 kg is produced, which results in a calculated air gap of 1.342 mm which corresponds to a deviation of 10.5%. For a fourth comparison point VS4, with a real air gap of 2.0 mm, a measured value of 1.5 kg is produced, which corresponds to a calculated air gap of 1.931 mm and this results in a deviation of 3.5%. For a fifth comparison point VS5, with a real air gap of 2.5 mm, a measured value of 1.224 kg is produced, which results in a calculated air gap of 2.354 mm and this means a deviation of 5.8%.

Figure 6:
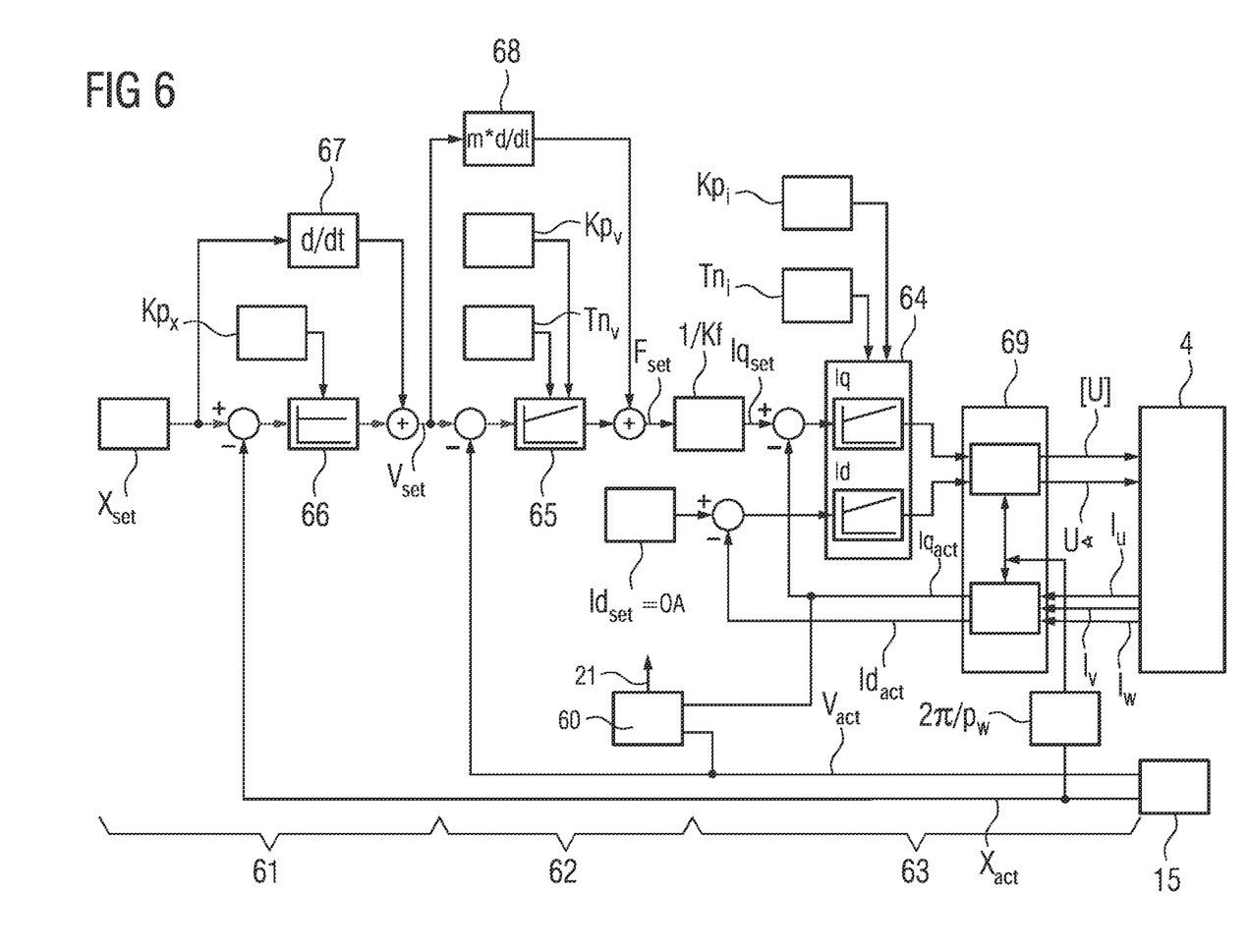
FIG. 6 shows a schematic illustration of an overview of a control for a control unit with the test device used in accordance with the invention.

FIG. 6 shows a schematic illustration of a vector-oriented servo control for the stator segments 13.1 and 13.2. This servo control is subdivided into a position control 61, a speed control 62 and a current control (vector control) 63. A setpoint position $X_{set}$ is controlled via a position controller 66 and a speed pre-control 67. A setpoint force Vset is controlled by means of a force pre-control 68 and a speed controller 65.

The vector-oriented servo control is set up in a cascade structure and includes position, rotational speed and current control. The current control is formed here in what is known as the vector control. This calculates the current phasor system fixed to the rotor (dq coordinate system), consisting of the currents $I_q$ and $I_d$, with the aid of the commutation angle from the current phasor system fixed to the stator (UVW coordinate system), consisting of the currents $I_u$, $I_v$ and $I_w$. Here, $I_q$ is the torque-generating current, which is a pure active current, and $I_d$ is the field-generating current.

Here, the field-generating current $I_d$ is controlled to zero in the controlled operation of the drive, which means that the motor is not operated in field-weakening mode at any operating point. The rotational speed pre-control and the torque pre-control improve the respective guide behavior of the controllers. A reset time $T_n$ and a proportional part $K_p$ of the individual controllers can be ascertained automatically and also adjusted in commissioning mode. Because this does not relate to the control of a rotary synchronous motor but instead relates to that of a linear synchronous motor which generates a force and no torque, the torque-generating current $I_q$ is referred to as the force-generating current. Moreover, the following relates to the force pre-control and not to the torque pre-control. The rotational speed controller is referred to as the speed controller and the rotational speed pre-control is referred to as the speed pre-control.

From the manipulated variable of the vector control, the inverter 4 generates a voltage phasor, represented by amount |U| and angle φ, where signals for actuating the IGBTs are provided via a PWM method. In the motor module, the controlled variables (phase currents) for the vector control are measured with corresponding measuring equipment.

The encoder evaluation makes the actual speed $V_{act}$ and the actual position $X_{act}$ available for the servo control. The commutation angle for the vector control is calculated via division of the actual position $X_{act}$ by the pole pair width pw and multiplication of 2Pi.

The controlled variable of the speed control is the speed of the transport rotor 14. The controlled variable is controlled with a Proportional Integral (PI) controller such that said controlled variable follows the setpoint speed value. The PI controller calculates the setpoint force. If the force pre-control is activated, then the setpoint force is added to the output of the force pre-control. The addition produces the manipulated variable.

In the vector-oriented current control method, the alternating variables (controlled variables) $I_u$, $I_v$, and $I_w$ are calculated into the dq coordinate system with the commutation angle. This produces DC values for the actual currents. They are divided into a force-generating ($I_{qact}$) and a field-generating component ($I_{dact}$). These DC variables can now be controlled with conventional PI controllers. One PI controller each is required for the force-generating part ($I_q$ controller) and one for the field-generating part ($I_d$ controller). The d component of the current can be used to weaken the field; this is not used, as already described. The setpoint value for the force-generating current component $I_{qset}$ is produced via division of the manipulated variable of the speed controller by the force constant $K_f$.

In order to detect an air gap change of a transport rotor 14 at an early stage, the test device 60 is integrated in the control algorithm in accordance with FIG. 6.

Figure 7:
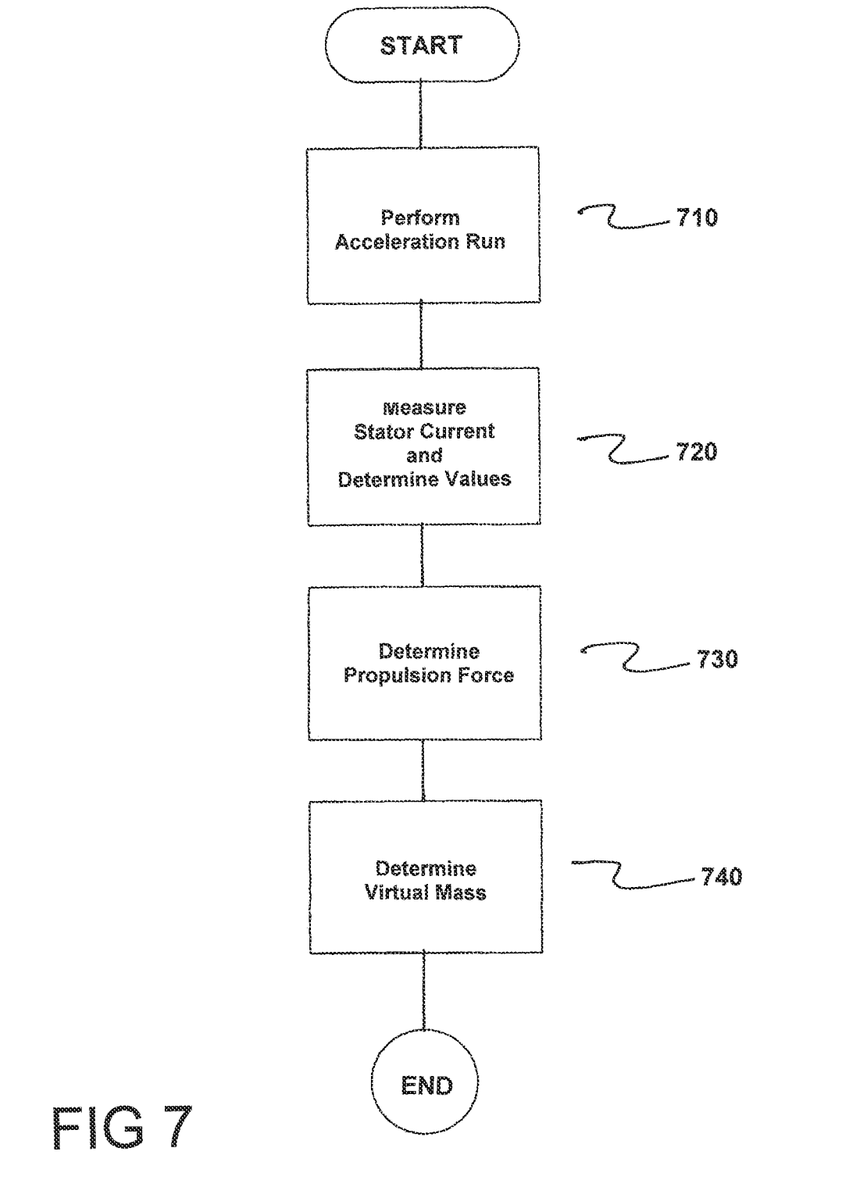
FIG. 7 is a flowchart of the method in accordance with the invention.

FIG. 8 is a flowchart of the method for determining an air gap δ between a transport rotor 14 and a stator segment 13.1, 13.2, where the transport rotor 14 and the stator segment 13.1, 13.2 are operated as a linear motor unit LME of a linear-motor-based transport system 100, the linear motor unit LME is assigned a force constant $k_f$, and the stator segment 13.1, 13.2 is supplied with a stator current $I_q$, such that a magnetic field is formed and a propulsion force $F_M$ for propelling the transport rotor 14 is thereby produced.

The method comprises performing an acceleration run of the transport rotor 14, as indicated in step 810.

Next, a present stator current $I_q$ is measured and actual speed values $V_{act}$ are determined, from which in turn a change in speed per time unit is determined, and from which in turn an acceleration a is determined, as indicated in step 820.

Next, a present propulsion force FM is determined from a product of a force constant $k_f$ and the present stator current $I_q$, as indicated in step 830.

Next, a virtual mass $m_v$ of the transport rotor 14 is determined with Newton's equation of motion based on the present propulsion force FM and the acceleration a, as indicated in step 840. In accordance with the method of the invention, a relationship between an increase $\Delta m$ in the virtual mass $m_v$ and an enlargement of the air gap is used and a size value for the air gap $\delta$ is calculated therefrom so as to obtain a statement about a currently prevailing air gap $\delta$.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for determining an air gap between a transport rotor and a stator segment, the transport rotor and the stator segment being operated as a linear motor unit of a linear-motor-based transport system, the linear motor unit being assigned a force constant, and the stator segment being supplied with a stator current, such that a magnetic field is formed and a propulsion force for propelling the transport rotor is thereby produced, the method comprising:
   performing an acceleration run of the transport rotor;
   measuring a present stator current and determining actual speed values, from which in turn a change in speed per time unit is determined, from which in turn an acceleration is determined;
   determining a present propulsion force from a product of a force constant and the present stator current; and
   determining a virtual mass of the transport rotor with Newton's equation of motion based on the present propulsion force and the acceleration;
   wherein for a statement about a currently prevailing air gap a relationship between an increase in the virtual mass and an enlargement of the air gap is used and a size value for the air gap is calculated therefrom.

2. The method as claimed in claim 1, wherein a compensation for a friction force occurring between the transport rotor and guide rails is provided.

3. The method as claimed in claim 2, wherein a spline function with polynomials is utilized as the relationship between the increase in the virtual mass and the enlargement of the air gap, said spline function being utilized d for interpolation with piecewise polynomials of a low degree; wherein the spline function utilizes interpolation nodes consisting of an x value and a y value;
   wherein the x value is assigned to the determined virtual mass and the y value is assigned to a size value for the air gap, the polynomials of the spline function each describing an interval and the boundary values of the intervals being assigned to values of the virtual mass; and
   wherein the determined virtual mass is used to search for an associated interval and a polynomial to be evaluated is thereby ascertained.

4. The method as claimed in claim 3, wherein the friction force is determined in a second function module aided by a friction characteristic, and the determination of the air gap is determined in a third function module.

5. The method as claimed in claim 2, wherein the friction force is determined in a second function module aided by a friction characteristic, and the determination of the air gap is determined in a third function module.

6. The method as claimed in claim 1, wherein a spline function with polynomials is utilized as the relationship between the increase in the virtual mass and the enlargement of the air gap, said spline function being utilized d for interpolation with piecewise polynomials of a low degree; wherein the spline function utilizes interpolation nodes consisting of an x value and a y value;
   wherein the x value is assigned to the determined virtual mass and the y value is assigned to a size value for the air gap, the polynomials of the spline function each describing an interval and the boundary values of the intervals being assigned to values of the virtual mass; and
   wherein the determined virtual mass is used to search for an associated interval and a polynomial to be evaluated is thereby ascertained.

7. The method as claimed in claim 6, wherein the friction force is determined in a second function module aided by a friction characteristic, and the determination of the air gap is determined in a third function module.

8. The method as claimed in claim 1, further comprising:
   calculating, in an automation device, one virtual mass in a first function module;
   wherein the stator current and the actual speed values are determined as input variables via sensors which are operated on the transport system; and
   wherein further input variables comprising the force constant and a real mass are queried from a data module.

9. An automation device configured to determine an air gap between a transport rotor and a stator segment, the transport rotor and the stator segment comprising a linear motor unit of a linear-motor-based transport system, the linear motor unit being assigned a force constant, and the stator segment being supplied with a stator current, such that a magnetic field is formed and a propulsion force for propelling the transport rotor is thereby produced, the automation device comprising:
   means for performing an acceleration run of the transport rotor;
   means for measuring a present stator current;
   means for determining actual speed values of the transport rotor, for determining a change in speed per time unit therefrom, and for determining an acceleration therefrom;
   means for determining a present propulsion force from a product of the force constant and the present stator current; and
   means for utilizing the present propulsion force and the acceleration to determine a virtual mass of the transport rotor with Newton's equation of motion;

a test device configured to ascertain a statement about a currently prevailing air gap, the test device being further configured to identify an increase in the virtual mass and to calculate a size value for the air gap utilizing a relationship which describes the increase in the virtual mass and an enlargement of the air gap.

10. The automation device as claimed in claim 9, further comprising:
   means for compensating for a friction force occurring between the transport rotor and guide rails.

11. The automation device as claimed in claim 10, wherein the test device is further configured to provide the relationship between the increase in the virtual mass and the enlargement of the air gap as a spline function, which interpolates with piecewise polynomials of a low degree;
   wherein the spline function includes interpolation nodes consisting of an x value and a y value;
   wherein the x value is assigned to the determined virtual mass and the y value is assigned to a size value for the air gap, the polynomials of the spline function each describing an interval and boundary values of the intervals being assigned to values of the virtual mass; and
   wherein the determined virtual mass is utilized to search for an associated interval and the polynomial with which the air gap is determined is thereby ascertained.

12. The automation device as claimed in claim 11, further comprising:
   a second function module which determines the friction aided by a friction characteristic; and
   a third function module which is configured to perform the determination of the air gap.

13. The automation device as claimed in claim 10, further comprising:
   a first function module with which the virtual mass is calculated;
   wherein sensors inputs which supply the stator current and the actual speed values as input variables; and
   a data module which stores the force constant and a real mass.

14. The automation device as claimed in claim 10, further comprising:
   a second function module which determines the friction aided by a friction characteristic; and
   a third function module which is configured to perform the determination of the air gap.

15. The automation device as claimed in claim 9, wherein the test device is further configured to provide the relationship between the increase in the virtual mass and the enlargement of the air gap as a spline function, which interpolates with piecewise polynomials of a low degree;
   wherein the spline function includes interpolation nodes consisting of an x value and a y value;
   wherein the x value is assigned to the determined virtual mass and the y value is assigned to a size value for the air gap, the polynomials of the spline function each describing an interval and boundary values of the intervals being assigned to values of the virtual mass; and
   wherein the determined virtual mass is utilized to search for an associated interval and the polynomial with which the air gap is determined is thereby ascertained.

16. The automation device as claimed in claim 9, further comprising:
   a first function module with which the virtual mass is calculated;
   wherein sensors inputs which supply the stator current and the actual speed values as input variables; and
   a data module which stores the force constant and a real mass.

17. The automation device as claimed in claim 16, further comprising:
   a second function module which determines the friction aided by a friction characteristic; and
   a third function module which is configured to perform the determination of the air gap.

* * * * *